Dec. 12, 1944.  G. E. COXON ET AL  2,364,603
ELECTRIC WINDSHIELD WIPER
Filed Feb. 9, 1940  4 Sheets-Sheet 1
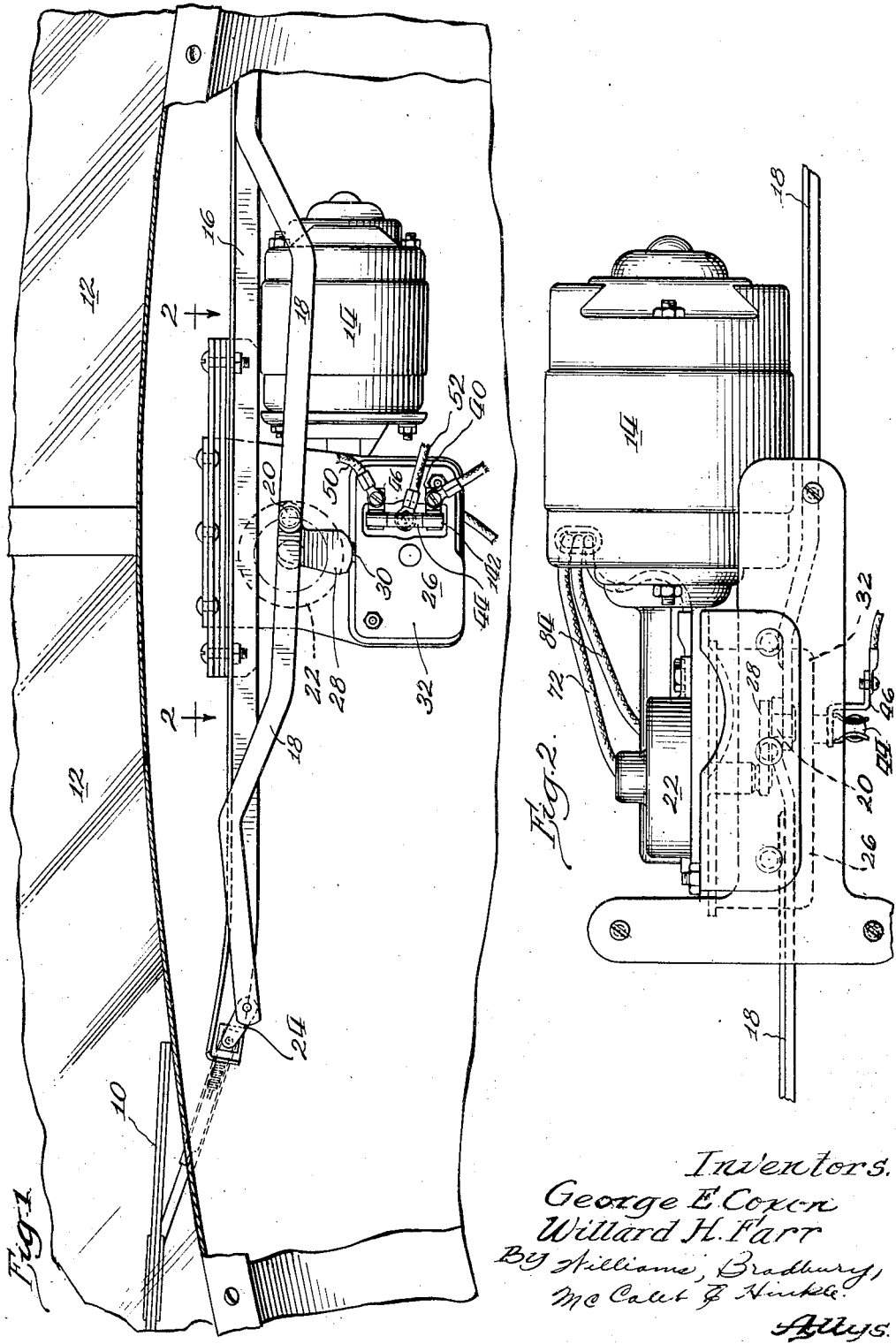
Inventors.
George E. Coxon
Willard H. Farr
By Williams, Bradbury,
McCaleb & Hinkle
Attys.

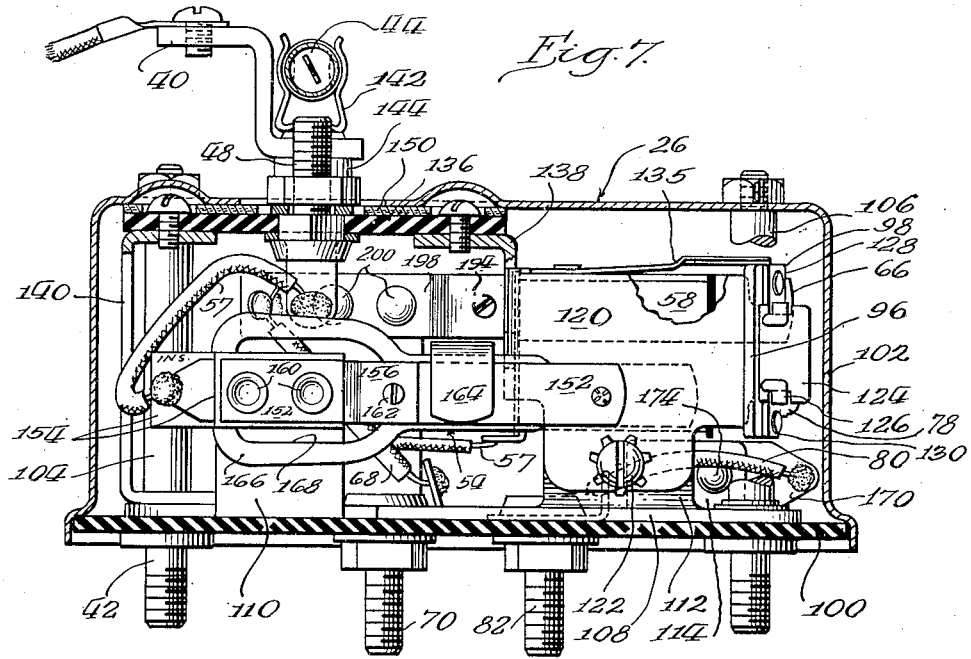

Dec. 12, 1944.    G. E. COXON ET AL    2,364,603
ELECTRIC WINDSHIELD WIPER
Filed Feb. 9, 1940    4 Sheets-Sheet 3
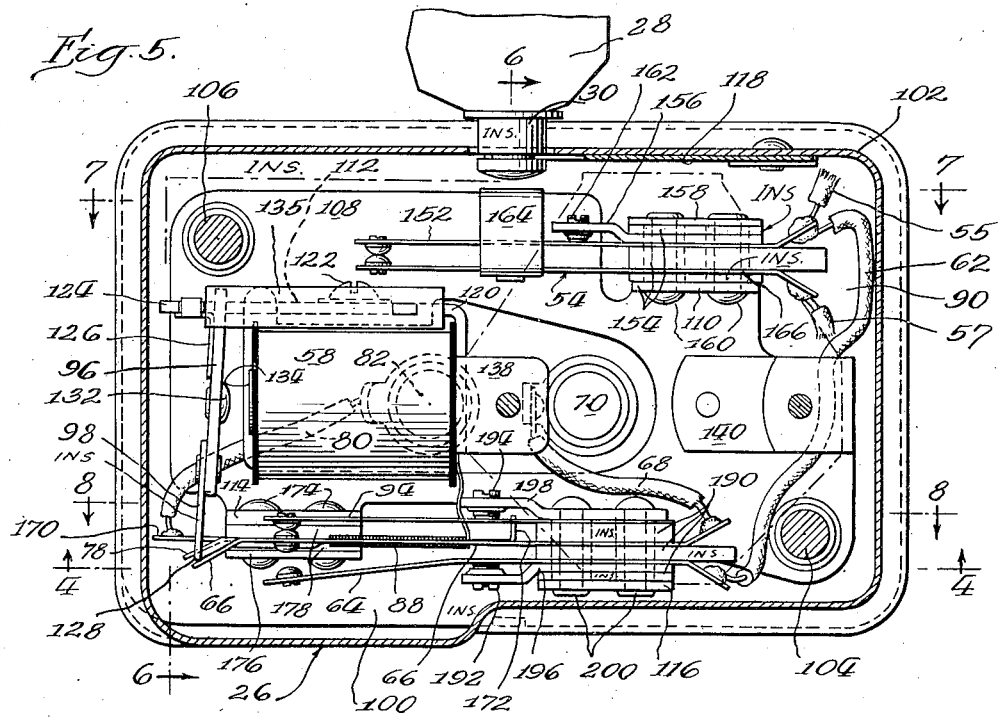
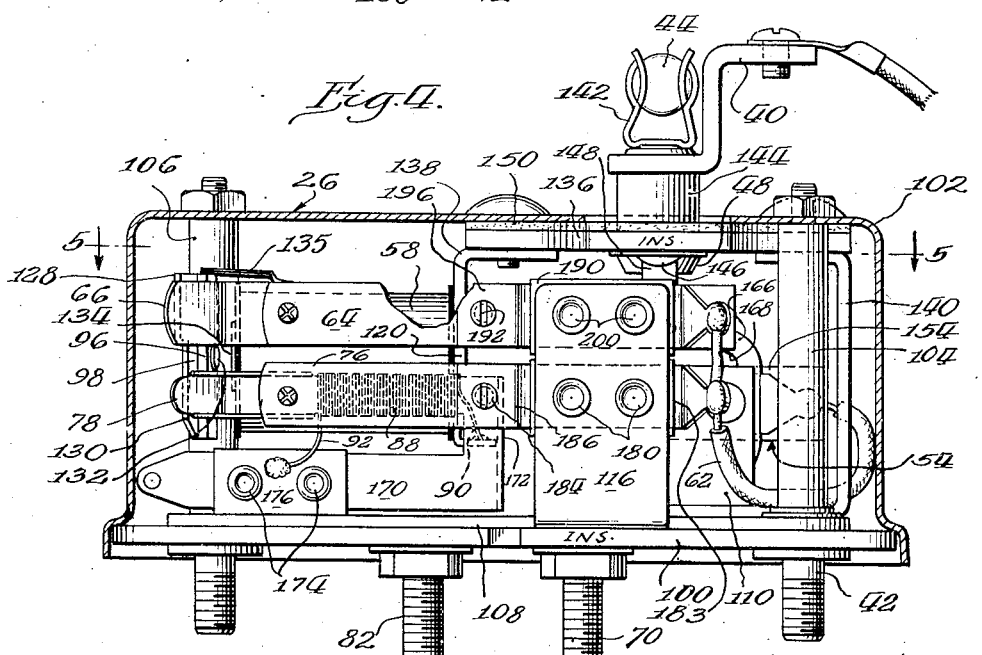
Inventors
George E. Coxon
Willard H. Farr
By Williams, Bradbury,
McCaleb & Hinkle, Attys Dec. 12, 1944. G. E. COXON ET AL 2,364,603
ELECTRIC WINDSHIELD WIPER
Filed Feb. 9, 1940 4 Sheets-Sheet 4
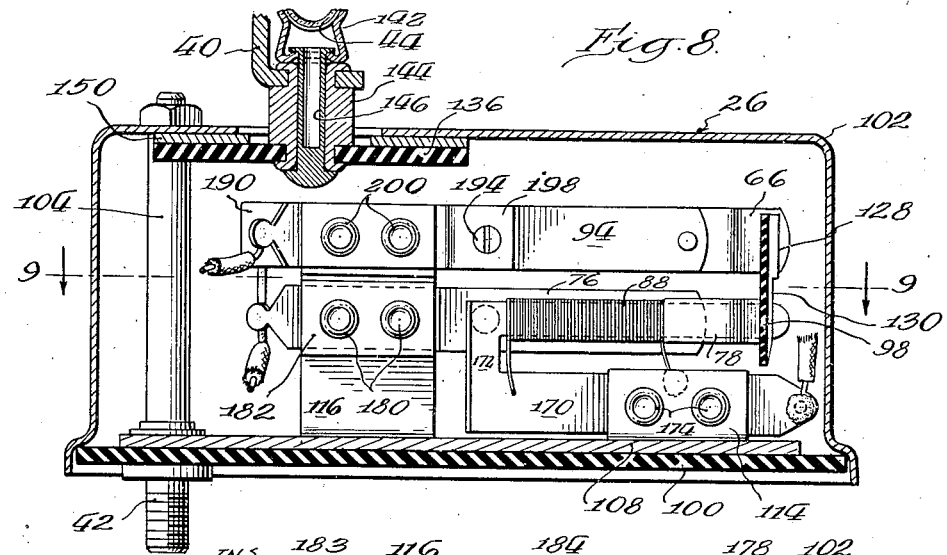
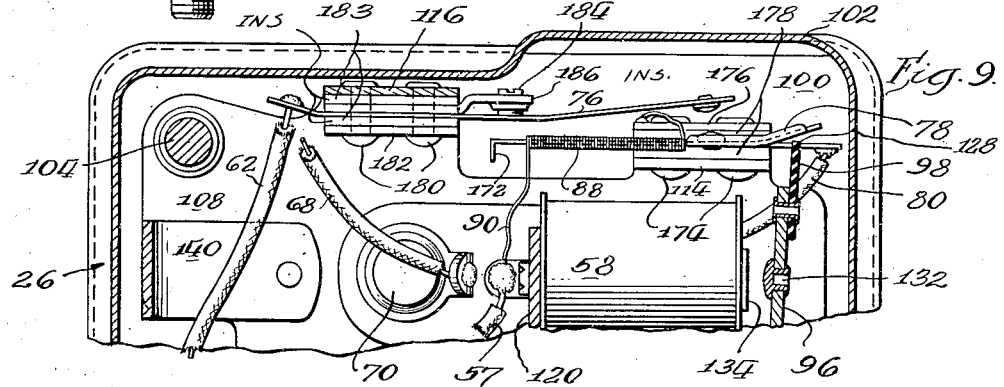
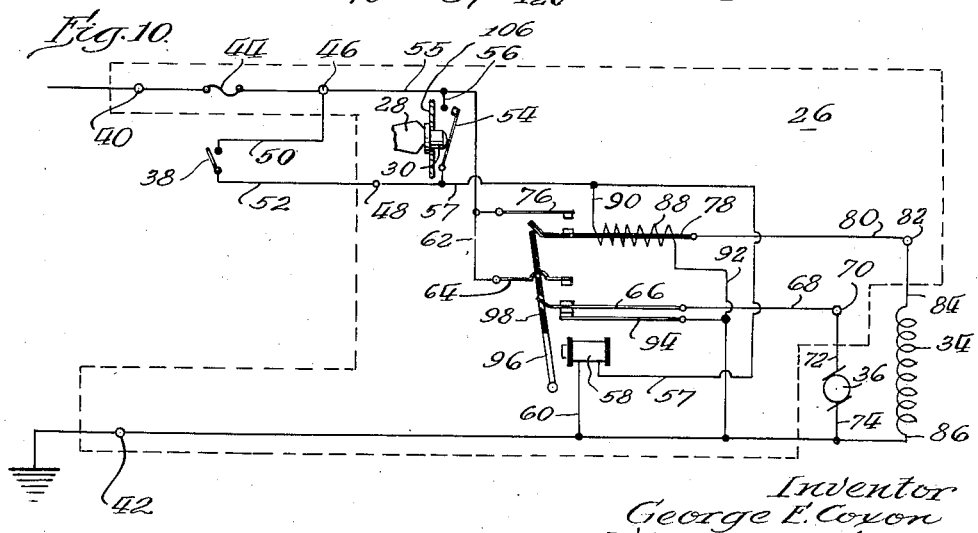
Inventor
George E. Coxon
Willard H. Farr
By Williams, Bradbury,
McCaleb & Hinkle Attys.

Patented Dec. 12, 1944

2,364,603

UNITED STATES PATENT OFFICE 2,364,603

ELECTRIC WINDSHIELD WIPER

George E. Coxon, Cicero, and Willard H. Farr, Chicago, Ill., assignors to Stewart-Warner Corporation, Chicago, Ill., a corporation of Virginia Application February 9, 1940, Serial No. 318,113

17 Claims. (Cl. 15—253)

The present invention relates to windshield wipers and has for its primary object the provision of a new and improved electrically actuated windshield wiper.

An object of the present invention is the provision of an electric motor actuated windshield wiper that is reliable in operation and which may be economically and simply manufactured and installed.

A further object of the present invention is the provision of a new and improved electric motor actuated windshield wiper so constructed and arranged that the wiper blade, or blades, are always parked in the same position when the wiper is turned off.

Another object of the present invention is the provision of a wiper of the type described, which is stopped substantially immediately when the electric motor is disconnected from the source of power.

Another object of the invention is the provision of a compact, economically manufactured, and readily assembled controlled mechanism for effecting the quick stopping of the motor and the proper parking of the blades.

Other objects and advantages of the present invention will become apparent from the ensuing description, in the course of which reference is had to the accompanying drawings, in which:

Fig. 1 is a partial vertical cross-sectional view through an automotive vehicle showing the apparatus of the present invention installed in the vehicle;

Fig. 2 is a partial top plan view, on a somewhat larger scale, of the apparatus shown in Fig. 1;

Fig. 3 is a partial front elevation of the control mechanism shown in the preceding figures;

Fig. 4 is a horizontal cross-sectional view, on an enlarged scale, taken along the line 4—4 of Fig. 3;

Fig. 5 is a vertical cross-sectional view, taken along the line 5—5 of Fig. 4;

Fig. 6 is a vertical cross-sectional view, taken along the line 6—6 of Fig. 5;

Figs. 7 and 8 are horizontal sectional views, taken along the lines 7—7 and 8—8 of Fig. 5;

Fig. 9 is a vertical sectional view, taken along the line 9—9 of Fig. 8; and

Fig. 10 is a schematic diagram of the electrical connections embodied in the apparatus of the present invention.

Referring now to the figures, and more particularly to Figs. 1 and 2, it may be seen that the conventional wiper blades 10 (only one of which is shown) are mounted so as to engage the windshield 12. They are oscillated by an electric motor 14 supported upon a transverse bracket 16. The motor is operatively connected to the blades through a pair of oppositely extending connecting rods 18, connected at their adjacent ends to a crank pin 20 rotated by the motor through reduction gears contained in a casing 22, and at their opposite ends to crank arms 24 (only one of which is shown) connected in turn to the blades through oscillatable pins (not shown) mounted upon and extending through the windshield frame. Rotation of crank pin 20 by the motor imparts reciprocatory motion to the crank arms 18, and these in turn oscillate the blades through the oscillatable pins.

The motor is controlled in part by a switch on the dashboard of the automobile and in part by the control mechanism contained within a casing 26, also supported by the bracket 16, in a manner to be described shortly in connection with Fig. 10. The control mechanism comprises a switch intermittently opened and closed by motor 14 through a depressor arm 28 actuating a switch operating button 30, which depressor arm carries the previously mentioned pin 20. In Fig. 1 the depressor arm and the button are shown in the positions occupied thereby when the switch, hereinafter to be referred to as a cam switch, is open.

The control mechanism is so constructed and arranged mechanically and electrically with respect to the dash switch that upon actuation of the dash switch the motor is immediately energized to operate the wiper blades. When the switch is actuated to cut off the supply of power to the motor, the motor is supplied with power through the cam switch until the wiper blades reach a certain position, whereupon the motor armature is connected to ground while the motor field remains energized dynamically to brake and quickly stop the motor with the blades in their proper parking position.

Referring now to Fig. 10, the control mechanism casing 26 may be seen to include the apparatus and connections schematically indicated within the dotted lines—all this being contained within or mounted upon the control mechanism casing. The motor field and armature are indicated by reference characters 34 and 36 and the dash switch by reference character 38. Power is supplied to the terminals 40 and 42, the latter being the ground terminal and the former being connected through a line fuse 44 to a terminal 46. The dash switch 38 is connected to terminal 46 and another terminal 48 through conductors 50 and 52, respectively. The cam switch 54 is connected to the same terminals, i. e., in parallel with switch 38, through conductors 55, 56 and 57, so that when either switch is closed, relay 58 is connected to the power supply through the switch and conductors 57 and 60. Connection of the relay across the power supply results in the energization of the motor armature and field; the former through the conductor 62, a relatively fixed spring contact arm 64, a movable spring contact arm 66, conductor 68, terminal 70, conductor 72, and ground connection 74; and the latter through conductor 62, a relatively fixed spring contact arm 76, a movable bimetallic spring contact arm 78 (which is compensated for changes in ambient temperature and the heating effect of current flowing therethrough in a manner to be described hereinafter), conductor 80, terminal 82, conductor 84, and ground connection 86. The spring arm 78 is so connected that when heated it moves upwardly.

In order to maintain the motor field 34 connected across the line to provide dynamic braking after de-energization of the solenoid, the contact arm 78 is surrounded by a heating coil 88 connected by conductors 90 and 92 to conductor 57 and ground, respectively. During dynamic braking, the armature circuit of the motor is closed through conductors 72, 68, the movable contact arm 66, a relatively fixed spring contact arm 94, and return connections 92 and 74.

The movable contact arms 66 and 78 are operated by the solenoid through an armature 96 carrying an insulated contact actuating arm 98.

To initiate operation of the windshield wiper, assuming terminals 40 and 42 to be connected to a source of power, such for instance as a battery and by means of the ignition switch, it is necessary only to close the dash switch 38. The motor armature and field are energized in the manner previously described through energization of relay 58, and the wiper blades oscillated and cam switch intermittently opened and closed. To stop the wiper, dash switch 38 is opened. If cam switch 54 happens to be open, relay 58 is immediately de-energized, but if not, the relay is de-energized when the wiper blades are in a certain position. The de-energization of the relay connects the motor armature to ground and permits the disengagement of contact arms 76 and 78 as soon as the latter has cooled. This effects quick stopping of the motor by dynamic braking and proper parking of the wiper blades.

The control mechanism of the present invention is rugged, economical to manufacture, and may be readily assembled, as will be brought out in the following description thereof, during the course of which reference is had mainly to Figs. 3 to 9, inclusive.

The casing 26 comprises a base 100 of insulating material and a detachable cover 102 attached by nuts to a pair of metallic posts 104 and 106 secured to the base. The posts secure to the base a metallic bracket 108 having right-angled projections 110, 112, 114 and 116, by means of which the cam switch 54, relay 58, bimetallic contact arm 78, and the contact arms 64, 66, 76 and 94, respectively, are attached thereto. Post 104 also forms the ground terminal 42. The cover 102 is apertured to receive the cam switch actuating button 30, which is resiliently biased toward the cover by a mounting spring 118, as best shown in Fig. 5.

The relay 58 is mounted on a generally right-angled supporting bracket 120 secured by a screw 122 to projection 112, as best shown in Figs. 5, 6 and 7. The relay armature 96 is apertured and loosely mounted on a reduced end portion 124 of bracket 120, where it is held in place by a stop 126 clipped to the end portion. The contact actuating portion 98, made of insulating material, is riveted to the free end of the armature. The free end of portion 98 is stepped, as indicated by reference characters 128 and 130 (see Fig. 6), so that it may engage and operate both contact arms 66 and 78, the end portions of which are at an angle to the major portions so as to provide easier movement of the contact arms by the relay, as well as the return of the armature to its normal position. The armature is provided with a button-like projection 132, to provide proper spacing between the armature and relay core 134 (see Figs. 5 and 9), and undesired chattering is prevented by a spring 135 peened on the side of bracket 120 and bearing against the edge of armature 96.

The fuse 44 is mounted on a fuse block 136 of insulating material mounted by screws upon a further projection 138 formed integral with the relay supporting bracket 120 and upon a U-shaped support 140 riveted to bracket 108 (see Figs. 4, 7 and 8). The fuse is mounted on spaced apart clips 142 secured and separated from the block 136 by metallic spacers 144 and hollow rivets 146, one of which has attached to it a terminal lug 148—the one to which fuse terminal 46 is secured. The terminal screw 48 is also mounted on the fuse block. A cork gasket 150 insures proper spacing between the fuse block and the cover 102. The fuse terminals 40 and 46 are also secured to the spacers.

The cam switch 54 is made in the form of a resilient contact arm, and it has associated with it a relatively fixed resilient contact arm 152. (See Figs. 5, 6 and 7.) These contact arms are mounted upon and insulated from the previously mentioned portion 110 of the supporting bracket 108, as well as from each other, by three insulating spacers 154. The contact arms, spacers, and an adjusting bracket 156 in engagement with contact arm 152 are all secured to bracket portion 110 by a plate 158 and a pair of rivets 160. A contact arm positioning screw 162 is mounted upon the outer end of bracket 156.

Cam switch 54, which is actuated by button 30, is provided with a U-shaped bracket 164 engageable by the button whenever the latter is depressed, whereby contact buttons mounted upon arms 54 and 152 are intermittently disengaged. To make arm 54 sufficiently resilient to withstand operation for a long period of time, it is made with an enlarged portion 166 and is provided with a U-shaped aperture 168, as best shown in Fig. 7, a rectangular portion (not shown) being secured between a pair of the insulating spacers 154.

The bimetallic contact arm mounted upon bracket portion 114 is compensated against movement as a result of ambient temperature and current variations by making it substantially U-shaped in construction. The U-shaped construction is afforded by the contact carrying and heater surrounded portion 78 and a portion 170 parallel thereto, the two being interconnected by a transverse portion 172. Upon variations in ambient temperature or the flow of current through the contact arm, the interconnected ends move and the free, contact carrying end of arm 78 remains stationary. When the heater 88 is energized, the heat generated thereby effectively acts upon arm 78, thereby causing the latter to remain in contact with contact arm 76 when the relay is de-energized, as explained heretofore. Portion 170 is secured to bracket portion 114 by rivets 174 and a plate 176 grounded by the rivets. Contact arm portion 172, however, is insulated by spacers 178.

Contact arm 76 associated with the bimetallic contact arm is mounted upon bracket portion 116 by a pair of rivets 180 and a plate 182, as best shown in Figs. 4, 8 and 9. A pair of spacers 183 insulate the arm from ground. The position of the arms may be adjusted by screw 184 mounted at one end of adjusting bracket 186 secured to the bracket adjacent the arm.

Contact arms 64, 66 and 94 are likewise mounted upon bracket portion 116. These arms are separated from each other and from the bracket portion 116 by three insulating spacers 190. Contact arms 64 and 94 may be adjusted by adjusting screws 192 and 194 mounted upon the ends of adjusting brackets 196 and 198 engaging contact arms 64 and 94, respectively. The various parts described are all secured to bracket portion 116 by rivets 200, which serve also to ground contact arm 94.

The motor armature and field terminals 70 and 82 are mounted on base 100 in spaced relationship to bracket 108.

The above described construction is compact and rugged so that its proper operation will not be affected by the vibration or jolting of the automobile. The various parts may be fabricated inexpensively and readily assembled.

While only one embodiment of the invention has been illustrated and described, it is to be understood that the invention is not limited to the specific details of the embodiment disclosed except as limited by the claims.

What we claim as new and desire to secure by Letters Patent of the United States is:

1. A control for a windshield wiper mechanically operable by an electric motor and a source of energy therefor, including in combination, means operable from a circuit breaking to a circuit making position, a relay energizable thereby for connecting the motor to said source of energy, a cam switch operable by the motor for maintaining the supply of power to the relay after the last-mentioned means has been returned to its circuit breaking position until said motor and wiper reach predetermined positions, and means operative upon deenergization of said relay for braking said motor for a time interval.

2. A control for windshield wiping means operable by an electric motor having an armature and field winding adapted to be energized from a source of energy, including in combination, a manually operable control switch, a relay energizable by said control switch and comprising switch means normally closing a circuit through the armature and operable to connect said armature and field to said source of energy, a cam actuated switch operable by the motor for maintaining said relay energized after opening of said control switch until the motor and wiping means reach predetermined positions, and means for maintaining the field winding temporarily connected to the source of energy after de-energization of the relay.

3. A control for a windshield wiper blade operable by an electric motor having an armature and a field winding adapted to be energized from a source of energy, including in combination, a relay, a manually operable switch for energizing said relay, a switch intermittently opened and closed by the motor connected in parallel to the manually operable switch, said relay having a winding in series with the switches and comprising normally open switch means in circuit with the motor armature and field and switch means normally closing a circuit through the armature, whereby when said manually operable switch is closed the relay is energized to open the circuit through the armature and the armature and field windings are connected to the source of energy to render the motor operative to drive the wiper, the switch means associated with the motor field comprising a bimetallic contact member and a heater connected in parallel with said relay winding, said bimetallic member being so arranged that the switch means remains closed temporarily to connect the field to the source of energy after de-energization of the relay, whereby when the manually operable switch is opened energy is supplied to the relay and heater until the motor and wiper blade are in predetermined positions and the motor is dynamically braked upon de-energization of the relay.

4. A control for a windshield wiper mechanically operable by an electric motor having an armature and a field winding adapted to be energized from a source of energy, including in combination, a relay, a manually operable switch for energizing said relay, a switch intermittently opened and closed by the motor connected in parallel to the manually operable switch, said relay having a winding in series with the switches, said relay also comprising normally open switch means in circuit with the motor armature and field and switch means normally closing a circuit through the armature, whereby when said manually operable switch is closed the relay is energized to open the circuit through the armature and the armature and field winding are connected to the source of energy to render the motor operative to drive the wiper, the switch means associated with the motor field comprising a bimetallic contact carrying member and a heater associated with said bimetallic member connected in parallel with said relay winding, said bimetallic member being so arranged that the switch means remains closed to connect the field to the source of energy after de-energization of the relay, whereby when the manually operable switch is opened energy is supplied to the relay and heater until the motor and wiper blade are in predetermined positions and the motor is dynamically braked upon deenergization of the relay.

5. A control for a windshield wiper mechanically operable by an electric motor having an armature and a field winding adapted to be energized from a source of energy, including in combination a relay, a manually operable switch for energizing said relay, a switch intermittently opened and closed by the motor connected in parallel to the manually operable switch, said relay having a winding in series with the switches, said relay also comprising normally open switch means in circuit with the motor armature and field and switch means normally closing a circuit through the armature, whereby when said manually operable switch is closed the relay is energized to open the circuit through the armature and the armature and field winding are connected to the source of energy to render the motor operative to drive the wiper, the switch means associated with the motor field comprising a contact, a bimetallic contact carrying member and a heater connected in parallel with said relay winding, said bimetallic member being so arranged that the switch means remains closed temporarily to connect the field to the source of energy after de-energization of the relay, whereby when the manually operable switch is opened energy is supplied to the relay and heater until the motor and wiper blade are in predetermined positions and the motor is dynamically braked upon de-energization of the relay, said bimetallic member being so constructed and arranged that the position of said contact is substantially unaffected by temperature changes resulting from changes in ambient temperature and current flow through said bimetallic member.

6. A relay including, in combination, a coil, an armature operable thereby, a contact carrying arm operable by said armature from one position to another, said arm being made of bimetallic material, and means including a heating element surrounding said arm energized simultaneously with said coil for temporarily maintaining said arm in its said other position after de-energization of said coil.

7. A relay including, in combination, a coil, an armature operable thereby, a current conducting arm operable by said armature from one position to another, said arm being substantially U-shaped, means supporting the outer end of one leg of the U, and a contact carried by the free end of the other, said arm being made of bimetallic material so arranged that the free contact carrying end of the other leg does not move to any substantial extent in response to temperature variations resulting from current flow through the arm or changes in space temperature.

8. A relay including, in combination, a coil, an armature operable thereby, a contact carrying arm operable by said armature from one position to another, said arm being substantially U-shaped and made of bimetallic material, means supporting the outer end of one leg of the U, a contact carried by the free end of the other, and means including a heating element surrounding the contact carrying leg of said arm energized simultaneously with said coil for temporarily maintaining said arm in said other position after de-energization of said coil.

9. In combination, a bracket, a coil mounted thereon, said bracket having a portion extending beyond the coil, an armature of substantially rectangular cross-section loosely mounted on said portion for pivotal movement in opposite directions, and resilient means attached to said bracket bearing against the edge of said armature in the vicinity of its pivot and biasing the armature in a direction generally coaxial with respect to its pivotal axis thereby uniformly to restrain pivotal movement of the armature in opposite directions.

10. In a switch, the combination including a movable resilient contact carrying arm, a relatively fixed contact arm substantially parallel to and spaced from said movable arm, means supporting said arms, a relatively narrow U-shaped bracket secured by one leg to said movable arm transversely of the arm, the other leg being spaced from the relatively fixed arm, an apertured closure for said switch, a leaf spring secured to the under side of said closure, and means movably extending through said aperture supported by said leaf spring adapted to engage said bracket.

11. A control mechanism, including in combination, a base of insulating material, a substantially centrally apertured metallic bracket secured to said base and having a plurality of projections extending away from said base, a relay coil mounted upon one of said projections, an armature associated with said coil, a pair of switch assemblies actuated by said armature, said assemblies being mounted upon projections located on one side of the coil, one of said assemblies comprising a pair of spaced apart relatively fixed contact arms and an intermediate movable contact arm actuatable by said armature from engagement with one into engagement with the other of said fixed contact arms, and a third relatively fixed contact arm located adjacent the others, and the second of said assemblies comprising a substantially U-shaped bimetallic contact arm, having a free leg actuatable by said armature into engagement with said third contact arm, said free leg being surrounded by heating means.

12. A control mechanism, including in combination, a base, a bracket secured to said base and having a plurality of projections extending away from said base, a relay coil mounted upon one of said projections, an armature associated with said coil, a pair of switch assemblies actuated by said armature, said assemblies being mounted upon projections located on one side of the coil, one of said assemblies comprising a pair of spaced apart relatively fixed contact arms and an intermediate movable contact arm actuatable by said armature from engagement with one into engagement with the other of said fixed contact arms, and a third relatively fixed contact arm located adjacent the others, and the second of said assemblies comprising a substantially U-shaped bimetallic contact arm, having a free leg actuatable by said armature into engagement with said third contact arm, said free leg being surrounded by heating means.

13. A relay including, in combination, a coil, an armature operable thereby, a contact carrying arm operable by said armature from one position to another, said arm being made of bimetallic material, and means including a heating element in heat transfer relationship to said arm energized simultaneously with said coil for temporarily maintaining said arm in its said other position after de-energization of said coil.

14. In apparatus of the class described, the combination including, an electric motor having a field winding, a relay having a coil, an armature operable thereby, and switch means operable by said armature for controlling the circuit connections of said motor, said switch means including a contact carrying arm operable from a field circuit opening to field circuit closing position upon energization of said relay, said arm being made of bimetallic material, and means including a heating element in heat transfer relationship to said arm energizable simultaneously with said coil for temporarily maintaining said arm in field circuit closing position after de-energization of said relay.

15. A control for a windshield winper mechanically operable by an electric motor adapted to be energized from a source of energy, including in combination, a manually operable control switch operable into on and off positions wherein it is adapted to remain until again operated, means controlled by said switch for effecting energization of said motor to operate the wiping means when said switch is operated to its on position, means effective upon operation of said switch to its off position for maintaining energization of said motor until said wiping means reaches a predetermined position, and temperature compensated means effective upon said wiping means reaching said position for dynamically braking said motor for a time interval and thereafter deenergizing said motor.

16. A control for a windshield wiper operable by an electric motor adapted to be energized from a source of energy, including in combination, a manually operable control switch operable between two circuit controlling positions, a relay winding in circuit with said control switch and energizable by said switch when the latter is in one position, means operable by said relay when said switch is operated into said one position for connecting the motor to the source of energy, a cam actuated switch operable by the motor for maintaining said relay energized when said control switch is operated to its other position until the wiping means is in a predetermined position, and means associated with the means operable by the relay for automatically dynamically braking the motor for a time interval after deenergization of said relay.

17. In apparatus of the class described, the combination including, an electric motor having a field winding and an armature, a relay, switch means operable by said relay for controlling the circuit connections of said motor, said switch means including a first contact carrying arm operable from armature shorting position to armature energizing position upon energization of said relay and from armature energizing to armature shorting position upon deenergization of said relay, said switch means including also a second contact carrying arm operable from a field circuit opening to field circuit closing position upon energization of said relay, said second mentioned arm being made of bimetallic material, and means including a heating element in heat transfer relationship to said second mentioned arm energizable simultaneously with said coil for temporarily maintaining said arm in field circuit closing position after deenergization of said relay.

GEO. E. COXON.
WILLARD H. FARR.